(12) United States Patent
Proidl

(10) Patent No.: US 6,308,269 B2
(45) Date of Patent: *Oct. 23, 2001

(54) ARRANGEMENT FOR INDEPENDENTLY REQUESTING A PLAYING AUTHORIZATION FOR A REPRODUCED ENCRYPTED INFORMATION SIGNAL

(75) Inventor: Adolf Proidl, Vienna (AT)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,614

(22) Filed: Jul. 7, 1998

(30) Foreign Application Priority Data

Jul. 11, 1997 (EP) .................................................. 97890135

(51) Int. Cl.$^7$ ....................................................... H04L 9/32
(52) U.S. Cl. ................................ 713/193; 705/51; 705/52
(58) Field of Search ................................. 705/51, 54, 52; 713/194, 193

(56) References Cited

U.S. PATENT DOCUMENTS

| | | | |
|---|---|---|---|
| 5,173,938 | * 12/1992 | Steinbrenner et al. | 380/273 |
| 5,319,705 | * 6/1994 | Halter et al. | 705/54 |
| 5,457,746 | * 10/1995 | Dolphin | 705/51 |
| 5,497,420 | * 3/1996 | Garneau et al. | 380/240 |
| 5,640,453 | 6/1997 | Schuchman et al. | 380/10 |
| 5,715,403 | * 2/1998 | Stefik | 705/44 |
| 5,796,824 | * 8/1998 | Hasebe et al. | 705/51 |
| 5,822,291 | * 10/1998 | Brindze et al. | 369/94 |
| 5,951,633 | * 9/1999 | Polcyn | 709/104 |
| 5,999,629 | * 12/1999 | Heer et al. | 705/51 |
| 6,000,030 | * 12/1999 | Steinberg et al. | 713/200 |
| 6,236,971 | * 5/2001 | Stefik et al. | 705/1 |

FOREIGN PATENT DOCUMENTS

WO9605700  2/1996 (WO).

* cited by examiner

Primary Examiner—Albert Decady
Assistant Examiner—Steve Kabakoff
(74) Attorney, Agent, or Firm—Edward W. Goodman

(57) ABSTRACT

An arrangement, for verifying a playing authorization for an encrypted information signal reproduced by a reproducing device and for supplying a decrypted information signal when a playing authorization is available, includes a verification device for verifying a playing authorization for a reproduced encrypted information signal, and a decryption circuit for decrypting a reproduced encrypted information signal when a playing authorization is available. The arrangement further includes an interrogation device for independently requesting a playing authorization. The interrogation device includes a communication circuit which, in the absence of a playing authorization for a reproduced encrypted information signal, sets up a data link and supplies playing authorization request information to a playing authorization allocation device via the data link, and receives a playing authorization for the reproduced encrypted information signal from the playing authorization allocation device.

9 Claims, 1 Drawing Sheet

ARRANGEMENT FOR INDEPENDENTLY REQUESTING A PLAYING AUTHORIZATION FOR A REPRODUCED ENCRYPTED INFORMATION SIGNAL

BACKGROUND OF THE INVENTION

1. Field of The Invention

The invention relates to an arrangement for verifying a playing authorization for a reproduced encrypted information signal reproduced by a reproducing device cooperating with the arrangement, and for supplying a decrypted information signal when a playing authorization is available, the arrangement comprising verification means for receiving a reproduced encrypted information signal and for supplying key information suitable for correctly decrypting the reproduced encrypted information signal when a playing authorization is available, and decryption means for receive key information and for decrypting the reproduced encrypted information signal when suitable key information is available.

2. Description of The Related Art

An arrangement of the type defined in the opening paragraph, is known, for example, from International Patent Application WO 96/05700 A1, corresponding to U.S. Pat. No. 5,640,453. In the known arrangement, which is formed by a so-called set-top box, the verification means enables identification information contained in a reproduced encrypted information signal to be determined. When such identification information is present, a playing authorization for the reproduced encrypted information signal is obtained. The identification information contains the key information which can be supplied to the decrypting means in order to decrypt the reproduced encrypted information signal. A reproduced decrypted information signal can be displayed by means of a television set which can be connected to the known arrangement.

The known arrangement is adapted to record characteristic playing information which characterizes the number and length of playing events of a decrypted information signal in the case of a playing authorization. Furthermore, by means of a data link, the known arrangement is connected to a broadcasting station which forms a play interrogation device. By interrogating the characteristic playing information recorded by the known arrangement, the play interrogation device can determine how many times and for how long an encrypted paid-service information signal reproduced by the playing device has been decrypted in the known arrangement and has, consequently, been used by the user of the known arrangement. Charging for the usually repeated reproduction of paid-service information signals can be effected on the basis of the characteristic playing information.

However, with regard the known arrangement, it has appeared that the presence of encrypted identification information in the reproduced encrypted information signal, this identification information allowing a correct decrypting of an encrypted information signal and being necessary for the correct operation of the known arrangement, has been used by unauthorized persons for making illegal copies which contain the information signal that has already been decrypted. Record carriers with decrypted information signals have been sold by persons not authorized to do so, resulting in substantial financial damage for broadcasting stations.

Moreover, when the characteristic playing information recorded with the known arrangement is interrogated by a play interrogation device, the problem arises that the play interrogation device initially has no information whether and where there is a known arrangement by means of which paid-service information signals, for which the collection of charges is effected by the play interrogation device, are reproduced. This considerably complicates the collection of charges for the reproduction of paid-service information signals.

Furthermore, it is not possible to rule out that the characteristic playing information recorded by the known arrangement is changed by a person not authorized to do so, which additionally complicates the collection of charges.

Moreover, with regard to the known arrangement, it has been found that, on the one hand, interrogating the characteristic playing information recorded by means of the known arrangement at comparatively long time intervals, will result in uncertainty for the user of the known arrangement as to the amount of the charges and, on the other hand, interrogating the characteristic playing information recorded by means of the known arrangement at comparatively short time intervals will result in a comparatively large expense for the broadcasting station.

SUMMARY OF THE INVENTION

It is an object of the invention to preclude the problems mentioned above and to provide an improved arrangement of the type defined in the opening paragraph, by means of which, on the one hand, manipulation in determining the charges for the reproduction of paid-service information signals is substantially precluded but, on the other hand, a high flexibility and a low cost in determining the charges can be obtained for a broadcasting station. According to the invention, this object is achieved in an arrangement of the type defined in the opening paragraph, characterized in that the arrangement is equipped with interrogation means for independently requesting a playing authorization. Thus, it is achieved in a simple manner that, by the arrangement in accordance with the invention, an independent request for a playing authorization is possible, when required. Upon reception of key information on which a playing authorization is based, a reproduced encrypted information signal can be decrypted by the arrangement in accordance with the invention. Manipulation by an unauthorized person is then ruled out almost completely because characteristic billing information is generated exclusively in the playing authorization allocation device upon reception of playing authorization request information. Furthermore, charging of the fees to the user of the arrangement in accordance with the invention can be effected at comparatively short time intervals and with a particularly low expenditure for the playing authorization allocation device.

In an arrangement in accordance with the invention having the characteristic features described above, it has proven to be advantageous if, in addition, the interrogation means includes communication means for setting up a data link between the communication means and at least one playing authorization allocation device in the absence of a playing authorization for a reproduced encrypted information signal, and the communication means supplies playing authorization request information to the playing authorization allocation device via the data link, and to receives a playing authorization for the reproduced encrypted information signal from the playing authorization allocation device. In practice, it has proven that such an embodiment is particularly reliable and simple and can be realized at comparatively low cost.

In an arrangement in accordance with the invention having the characteristic features described above, it has proven to be advantageous if, in addition, the verification means reads out and supplies enable information which is contained in a reproduced encrypted information signal and which identifies a playing authorization allocation device allowed to allocate a playing authorization for the reproduced encrypted information signal, and the communication means supplies playing authorization request information to the playing authorization allocation device identified by the enable information. In this way, it is achieved that playing authorization request information for a given paid-service information signal can be supplied to the playing authorization allocation device, which is capable of allocating a playing authorization for this given paid-service information signal. Moreover, the key information, which is necessary for decrypting the reproduced encrypted information signal and which is transmitted to the arrangement upon reception of the playing authorization, is stored only in the playing authorization allocation device identified by the enable information.

In an arrangement in accordance with the invention having the characteristic features described above, it has proven to be advantageous if, in addition, the arrangement further comprises receiving means for receiving an encrypted information signal supplied by a broadcasting station, the encrypted information signal containing enable information which identifies a playing authorization allocation device allowed to allocate a playing authorization for the encrypted information signal; and interface means for supplying an encrypted information signal containing the enable information to a recording and reproducing device cooperating with the interface means in order to record the encrypted information signal. This has the advantage that encrypted information signals transmitted by a broadcasting station and received by the arrangement in accordance with the invention, these signals containing enable information identifying a playing authorization allocation device enabled to allocate a playing authorization, can be supplied to a recording and reproducing device for recording the encrypted information signal. As a result of this, determining the charges for the reproduction of paid-service information signals from a plurality of broadcasting stations can be effected by only one playing authorization allocation device.

In an arrangement in accordance with the invention having the characteristic features described above, it has further proven to be advantageous if, in addition, the communication means comprises memory means for storing connection set-up information from playing authorization allocation device identified by enable information; and the communication means, in the absence of a playing authorization for a reproduced encrypted information signal containing given enable information, sets up a data link, using the connection set-up information stored in the memory means, for supplying playing authorization request information to the playing authorization allocation device identified by the given enable information, and for receiving a playing authorization for the reproduced encrypted information signal via the data link. This has the advantage that the connection set-up information of a plurality of playing authorization allocation devices can be stored and that playing authorization request information can be supplied to a playing authorization allocation device via the data link in a particularly simple manner and with only a very small time delay.

In an arrangement in accordance with the invention having the characteristic features described above, it has proven to be advantageous if, in addition, the communication means supplies playing authorization request information identifying the reproduced encrypted information signal to a playing authorization allocation device, and receives key information from the playing authorization allocation device, this key information being dependent on the playing authorization request information. This has the advantage that, on the basis of the playing authorization request information, a playing authorization allocation device can detect which paid-service information signal the user of the arrangement wishes to play. As a result of this, determining the charges is possible is in a particularly flexible manner.

In an arrangement in accordance with the invention having the characteristic features described above, it has proven to be advantageous if, in addition, the arrangement further comprises processing means for decoding a reproduced non-encrypted information signal, said processing means also forming part of the interrogation means, and supplying control information to the communication means, this control information being characteristic of an incorrect decryption of a reproduced encrypted information signal due to the absence of a playing authorization. This has the advantage that the presence or absence of a playing authorization for a reproduced paid-service information signal can be detected in a particularly simple manner.

In an arrangement in accordance with the invention having the characteristic features defined above, it has proven to be advantageous if, in addition, the verification means includes a key stage for receiving first key information, received in the communication means from a playing authorization allocation device, and for receiving second key information contained in the reproduced encrypted information signal, the key stage, when a playing authorization is available, jointly processing the first key information and the second key information, and supplying composite key information to the decryption means, this composite key information being suitable for the correct decryption of the reproduced encrypted information signal. As a result of the provision of key information composed of first key information and second key information, a particularly high degree of protection against manipulation by unauthorized persons can be achieved with the arrangement in accordance with the invention. Such encrypting systems are used, for example, during transmission in accordance with the Digital Video Broadcasting Standard.

In an arrangement in accordance with the invention having the characteristic features described above, it has proven to be advantageous if, in addition, the arrangement further comprises control means for supplying, in the absence of a playing authorization, pause information to the reproducing device via interface means in order to interrupt the reproduction of an encrypted information signal, and for supplying, when, subsequently, a playing authorization for the encrypted information signal is available, end-of-pause information to the reproducing device via the interface means in order to resume reproduction of the encrypted information signal. This has the advantage that the reproduction of a paid-service information signal is interrupted until a playing authorization from a playing authorization allocation device appears, and the user of the arrangement consequently does not miss a part of the paid-service information signal during the reproduction of this signal.

The aforementioned aspects as well as further aspects of the invention will be apparent from the embodiment described hereinafter by way of example and will be elucidated on the basis of this embodiment.

BRIEF DESCRIPTION OF THE DRAWING

The invention will now be described in more detail with reference to the embodiment shown in the drawing and given by way of example, but to which the invention is not limited, in which.

DESCRIPTION OF THE PREFERRED EMBODIMENTS

Figure 1:
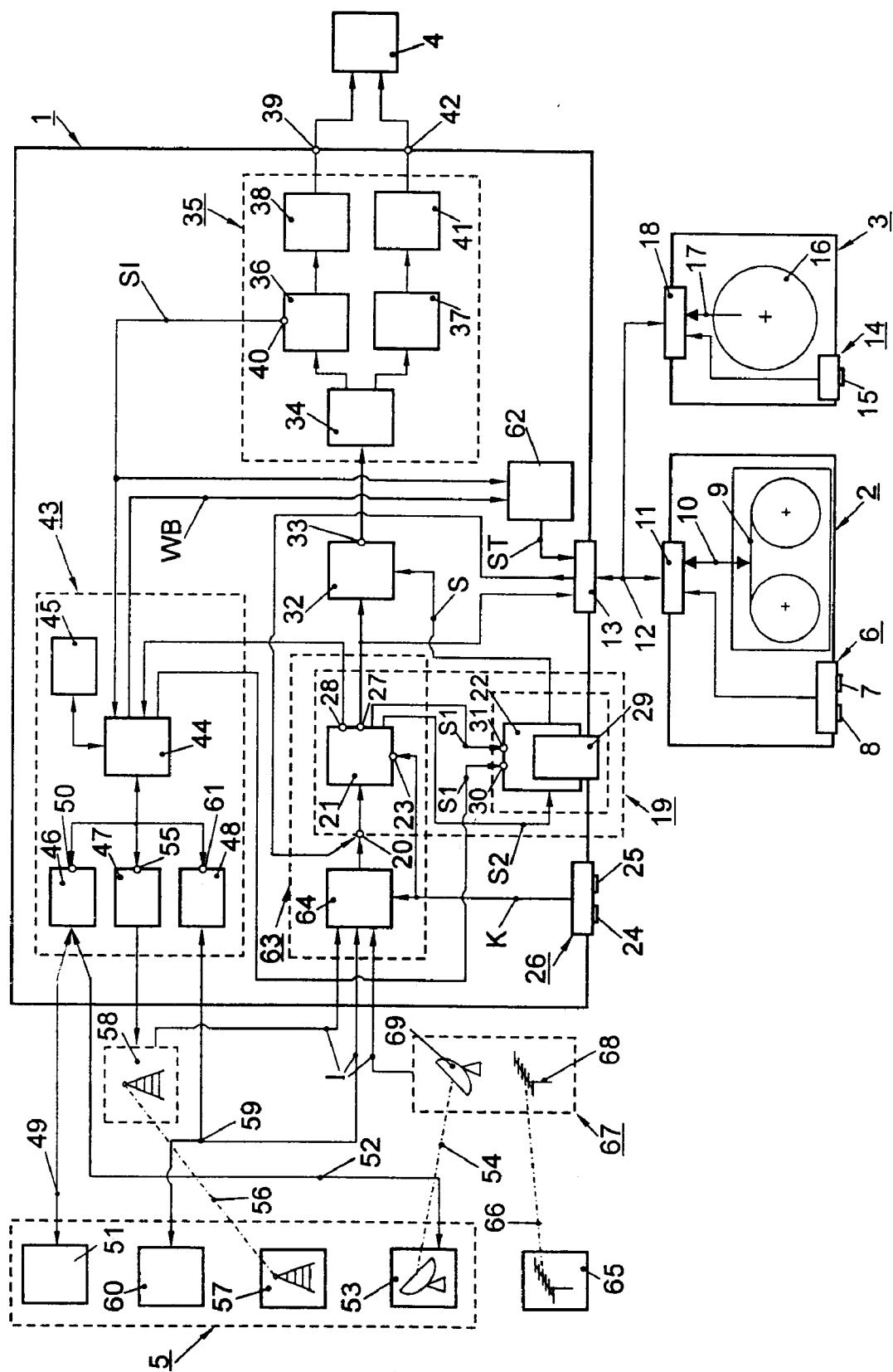
FIG. 1 shows a diagrammatic representation in the form of a block diagram of an arrangement in accordance with the invention to which an encrypted paid-service information signal can be applied and which is constructed for independently requesting a playing authorization for the information signal in the absence of such a playing authorization.

FIG. 1 shows an arrangement 1 formed by a so-called set-top box constructed to verify a playing authorization for a paid-service information signal I reproduced by means of a reproducing device, this information signal being available at a charge and is therefore encrypted. An information signal I can be reproduced, for example, by a DVHS video recorder 2, which forms a recording and reproducing device, or by a DVD apparatus 3, which forms a reproducing device. When a playing authorization exists, the arrangement 1 supplies a decrypted information signal I to a TV set 4. A playing authorization can be given by the fact that an information signal reproduced by the reproducing device is not encrypted. A playing authorization for a reproduced encrypted paid-service information signal I is given by the presence of key information S suitable for successfully decrypting the encrypted information signal I. Suitable key information S can be stored in the arrangement 1 or can be received from playing authorization allocation means 5, which includes one or more playing authorization allocation devices, which will be described in greater detail hereinafter.

The DVHS video recorder 2 comprises entry means 6 which includes a play button 7 and a record button 8. By actuating the play button 7, the DVHS video recorder 2 is set to a play mode in which, in a generally known manner, the DVHS video recorder 2 reproduces digital information signals I recorded on a magnetic tape 9 in accordance with the DVHS standard. Reproduced information signals I are then applied to first interface means 11 via an operating connection 10. The first interface means 11 then transmits information signals I and control signals ST via a generally known data bus in accordance with the bus standard IEEE 1394. Information signals I reproduced in the play mode are supplied from the first interface means 11 to second interface means 13 of the arrangement 1 via a bus connection 12.

The DVD apparatus 3 comprises entry means 14 which includes a play button 15. By actuating the play button 15, the DVD apparatus 3 is set to a play mode in which, in a generally known manner, the DVD apparatus 3 reproduces digital information signals I recorded on a Digital Versatile Disc (DVD) in accordance with the DVD standard. In the play mode, reproduced information signals I are applied to the second interface means 13 of the arrangement 1 via an operating connection 17, third interface means 18 of the DVD apparatus 3 and the bus connection 12.

The arrangement 1 comprises verification means 19 having an information signal input 20 for receiving a reproduced encrypted information signal I from the second interface means 13. The verification means 19 comprises a processing stage 21, known as a PID selector, and a key stage 22.

A reproduced encrypted information signal I is applied from the information signal input 20 to the processing stage 21. A reproduced encrypted information signal I in accordance with the ISO/IEC 13818-1 standard is formed by successive information signal blocks of 188 bytes each. These information signal blocks accommodate a plurality of video channels and audio channels as well as additional information for a video channel or an audio channel. A reproduced encrypted information signal I contains enable information E, which forms additional information. Enable information E identifies a playing authorization allocation device of the playing authorization allocation means 5, which is enabled or authorized to allocate a playing authorization for the paid service information signal I which contains the enable information E.

The processing stage 21 has a control input 23 for receiving channel-control information K from input means 26, the input means including an "up" button 24 and a "down"0 button 25. By actuating the "up" button 24 or the "down" button 25, a video channel and its associated audio channel contained in the reproduced encrypted information signal I can be selected. The selected video channel, the associated audio channel as well as additional information associated with these two channels, are applied in the form of information signal blocks from the processing stage 21 to an information signal output 27 of the processing stage 21. Enable information E associated with the selected video channel and the accompanying audio channel is applied to an enable output 28 of the processing stage 21.

When a reproduced information signal I is a paid-service information signal I and is therefore encrypted, the reproduced information signal I is encrypted by scrambling, i.e., by time-shifting the information signal blocks. A reproduced encrypted information signal includes a further additional information, i.e., second key information S2, also known as ECM information in the DVB standard. Second key information S2 contains information about how to restore the scrambled, i.e., time-shifted information signal blocks to the correct sequence, and thus on how to decrypt them. However, such second key information S2 is also encrypted and can only form composite key information S suitable for decrypting a reproduced encrypted I in conjunction with first key information S1, which is known as EMM information in the DVB standard and which serves for decrypting the second key information S2. In order to achieve an effective protection against an unauthorized reproduction of a paid-service information signal I by non-authorized persons, the second key information S2 is changed at short periodic time intervals. The first key information S1 is usually changed at long periodic intervals and is transmitted as additional information in an information signal I.

A membership card 29 can be inserted into the key stage 22, this card being formed by a so-called smart card and in which first key information S1 is stored upon payment of a membership fee. Upon payment of a fee by the owner of the membership card 29, new first key information S1 is stored in the membership card 29 allowing the owner of the membership card 29 to decrypt and thus use the paid-service information signal I for, for example, the next several weeks.

Second key information S2 is applied from the processing stage 21 to the key stage 22. In conjunction with the membership card 29, the key stage 22 decrypts the second key information S2 using first key information S1 stored in the membership card 29 and last applied to a first key input 30 or to a second input 31. In the case of playing authorization, the membership card 29 stores suitable first key information S1 for the second key information S2 contained in the reproduced encrypted information signal I, as a result of which, the key stage 22 jointly processes the first key information S1 and the second key information S2, and supplies composite key information S suitable for correctly decrypting the reproduced encrypted information signal I. As a result, reproduced encrypted information signals I are applied to the information signal input 20 of the verification means 19 and, in the case of a playing authorization, the verification means 19 supplies composite key information S for the correct decryption of the reproduced encrypted information signal I. Due to the provision of composite key information S, formed by the first key information S1 stored in the membership card 29 and the second key information S2 contained in the reproduced encrypted information signal I, a particularly high protection against manipulation by an unauthorized person is achieved with the arrangement in accordance with the invention.

The composite key information S is applied to decrypting means 32, which, in the present case, is formed by a so-called descrambler. Furthermore, a reproduced encrypted information signal I, appearing on the output 27 of the processing stage 21, is applied to the decrypting means 32. Decryption of the information signal I, which has been encrypted by scrambling of information signal blocks, is effected by restoring the correct time sequence, i.e., by descrambling the information signal blocks of the encrypted information signal I.

If the reproduced information signal I is a toll-free and, consequently, non-encrypted information signal I, the information signal I applied to the decryption means 32 can be transferred directly to an output 33 of the decryption means 32. However, if a reproduced information signal I available on the information signal output 27 of the processing stage 21 is a paid-service information signal I, which is consequently encrypted, the decryption means 32 effects a decryption of the encrypted information signal I. It is to be noted that the decryption means 32, which only receives composite key information S suitable for the correct decryption of the encrypted information signal I in the case of a playing authorization, only produces a decrypted information signal I on the output 33 in the case that a playing authorization is available. However, if playing authorization is not available and the decryption means 32 does not receive composite key information S suitable for the correct decryption of the encrypted information signal I, no decrypted information signal I, but merely an incorrectly decrypted and therefore, in fact, still encrypted information signal I is available on the output 33 of the decryption means 32.

An information signal I available on the output 33 of the decryption means 32 is applied to a demultiplexer stage 34 provided in the processing means 35, which, in the present case, also forms part of the interrogation means for independently requesting a playing authorization. The demultiplexer stage 34 supplies the video information signal blocks, corresponding to the selected video channel and contained in the information signal I, to first decoder means 36, and supplies audio information signal blocks, corresponding to the selected audio channel and contained in the information signal I, to second decoder means 37.

The first decoder means 36 is formed by an MPEG decoder and decodes the video information signal blocks encoded in accordance with an MPEG standard. A decoded digital video information signal is applied from the first decoder means 36 to a digital-to-analog converter stage 38, which, in turn, supplies an analog video information signal to a video output 39 of the arrangement 1. The first decoder means 36 has a control information output 40 on which control information SI is available if the first decoder means 36 does not succeed in decoding the video information signal blocks. This is the case if, due to the absence of a playing authorization, not a decrypted but an incorrectly decrypted and, consequently, encrypted information signal appears and, as a result of this, incorrectly decrypted, i.e., in fact, encrypted video information signal blocks are applied to the first decoder means 36.

The second decoder means 37 includes an MPEG decoder and an AC-3 decoder, and decodes the audio information signal blocks which have been encoded in accordance with an MPEG standard or the AC-3 standard. A decoded digital audio information signal is supplied from the second decoder means 37 to a digital-to-analog converter stage 41, which, in turn, supplies an analog audio information signal to an audio output 42 of the arrangement 1.

The TV set 4 is connected to the video output 39 and the audio output 42, and reproduces the information signal I.

The arrangement 1 in accordance with the invention now comprises interrogation means for independently requesting a playing authorization. The interrogation means includes communication means 43, which, in the absence of a playing authorization for a reproduced encrypted information signal characterized by the appearance of control information SI, establishes a data link to at least a playing authorization allocation device of the playing authorization allocation means 5. For this purpose, control information SI, available on the control information output 40 of the first decoder means 36, is applied to a control unit 44 of the communication means 43. Furthermore, enable information E, available on the enable output 28 of the processing stage 21, is applied to the control unit 44. The communication means 43 further comprises memory means 45 connected to the control unit 44 for storing connection set-up information of playing authorization allocation devices 5 of the playing authorization allocation means, these devices being characterized by the enable information E. Connection set-up information is formed by a telephone number of a playing authorization allocation device, a given address in a radio communication network or by a given reverse channel of a cable system, as will be described in more detail hereinafter.

For the communication with a playing authorization allocation device of the playing authorization allocation means 5, the communication means 43 comprises a first communication stage 46, a second communication stage 47 and a third communication stage 48. In the present case, the first communication stage 46 is formed by a so-called modem for establishing a data link formed by a telephone connection 49. To set up a telephone link 49, the first communication stage 46 has an input 50 for receiving connection set-up information in the form of a telephone number of a charge collection device which, at the same time, constitutes a first playing authorization allocation device 51 of the playing authorization allocation means 5. Moreover, connection set-up information in the form of a further telephone number can be applied to the input 50 of the first communication stage 46, for setting up a further telephone link 52 between the first communication stage 4 and a first broadcasting station which, at the same time, constitutes a second playing authorization allocation device 53 of the playing authorization allocation means 5. The first broadcasting station transmits TV programs in the form of encrypted or non-encrypted information signals I by satellite via a satellite link 54. Furthermore, the first broadcasting station is allowed or authorized to issue playing authorizations for pay television programs transmitted by the first broadcasting station, these programs being recorded in a recording and reproducing device and being reproduced at a later instant.

Connection set-up information in the form of an address in a radio communication network is applied to an input 54 of the second communication stage 47. Using the address in a radio communication network, the second communication stage 47 sets up a data link in the form of an microwave link 56 between the second communication stage 47 and a second broadcasting station which, at the same time, forms a third playing authorization allocation device 57 of the playing authorization allocation means 5. For this purpose, the second communication stage 47 supplies microwave signals to a microwave antenna 58. Such microwave links between a broadcasting station and a set-top box are known as "wireless cable" radio links. The second broadcasting station 57 transmits TV programs consisting of encrypted or non-encrypted information signals I via the microwave link 56, and is allowed and authorized to allocate playing authorizations for TV programs which are transmitted by the second broadcasting station, recorded in a recording and reproducing device, and reproducible at a later instant.

The third communication stage 48 sets up a data link to a cable TV service unit 60 via a cable TV system 59, this cable TV service unit also forming a broadcasting station and a fourth playing authorization allocation device 60 of the playing authorization allocation means 5. For this purpose, an input 61 of the third communication stage 48 receives channel information characterizing the reverse channel for the transmission of information to the cable TV service unit. The cable TV service unit transmits TV programs consisting of encrypted or non-encrypted information signals I via the cable TV system 59, and is allowed and authorized to allocate playing authorizations for pay TV programs which are transmitted by the cable TV service unit, recorded in a recording and reproducing device, and reproducible at a later instant.

All the connection set-up information, i.e., the first and second telephone numbers, the address in a radio communication network and the channel information, is stored in the memory means 45 in such a manner that when enable information E characterizing one of the playing authorization allocation devices 51, 53, 57 and 60 of the playing authorization allocation means 5 appears, the control unit 44 causes the relevant connection set-up information to be read from the memory means 45. The connection set-up information thus read enables a data link to be set up from the communication means 43, i.e., the arrangement 1, to the playing authorization allocation device 51, 53, 57 or 60 identified by the enable information E. The control unit 44 supplies connection set-up information read from the memory means 45 to the input 50 of the first communication stage 46, or to the input 55 of the second communication stage 47, or to the input 61 of the third communication stage 48, in dependence upon the type of connection set-up information that has been read. Connection set-up information in the form of telephone numbers is then supplied to the first communication stage 46, connection set-up information in the form of addresses in a radio communication network is supplied to the second communication stage 47, and connection set-up information in the form of channel information is supplied to the third communication stage 48.

When an encrypted paid-service information signal I is to be played from a purchased pre-recorded DVHS cassette by the DVHS video recorder 2, and the first key information S1 required for the decryption of the second key information S2 contained in the paid-service information signal I is not stored in the membership card of the key stage 22, no playing authorization exists. When a purchased or a freely distributed pre-recorded DVHS has been manufactured by a firm which has transferred the collection of charges for playing of the encrypted paid-service information signal I recorded on the pre-recorded DVHS cassette to the charge collection device which is formed by the first playing authorization allocation device 51, the information signal recorded on this DVHS contains enable information which identifies this first playing authorization allocation device 51.

By actuating the play button 7, the DVHS video recorder 2 is set to the play mode to reproduce the encrypted paid-service information signal from the DVHS cassette in the DVHS video recorder. The reproduced encrypted information signal I is applied to the information signal input 20, and eventually to the processing stage 21 of the verification means 19 via the first interface means 11, the bus connection 12 and the second interface means 13. The enable information E contained in the reproduced encrypted information signal I is detected by the processing stage 21 and is applied to the enable output 28. In a manner not shown in FIG. 1, the user of the arrangement 1 may be prompted to insert a membership card 29 made available by the first playing authorization allocation device 51.

If the membership card 29 does not contain the correct first key information S1 and there is consequently no playing authorization for the encrypted information signal I reproduced from the prerecorded DVHS cassette, the decryption means 32 cannot produce a decrypted information signal I on the output 33. As a consequence, the video information signal blocks in the reproduced encrypted information signal I cannot be decoded correctly, as a result of which, the first decoder means 36 supplies control information SI to the control unit 44. The enable information E, detected by the processing stage 21 and available on the enable output 28 of this stage, is also applied to the control unit 44. The control unit 44 then reads the first telephone number from the memory means 45 in order to set up the telephone link 49 to the first playing authorization allocation device 51 identified by the enable information E, and transfers this first telephone number to the first communication stage 46. The first communication stage 46, formed by a modem, dials the first telephone number of the first playing authorization allocation device 51 and thus sets up the telephone link 49. After a successful set-up of the telephone link 49, the control unit 44 supplies playing authorization request information to the first playing authorization allocation device 51 via the first communication stage 46 and via the first telephone link 49.

With the aid of the playing authorization request information, the first playing authorization allocation device 51, which is formed by the charge collection device, checks whether it is possible to collect the charges via an existing membership of the owner of the membership card 29 with the first playing authorization allocation device 51. On the basis of the playing authorization request information, which includes, for example, the date of recording of the information signal I to be reproduced, the first playing authorization allocation device 51 determines the first key information S1, this first key information S1 being necessary, in conjunction with the second key information S2 contained in the paid-service information signal I, to form a composite key information S suitable for the correct decryption of the reproduced encrypted paid-service information signal I. If a possibility of collecting charges from the owner of the membership card 29 exists in the first playing authorization allocation device 51 and if the appropriate first key information S1 has been detected, the first playing authorization allocation device 51 gives a playing authorization by transferring the first key information S1 to the control unit 44 of the communication stage 43 via the first telephone link 49 and the first communication stage 46. When the first key information S1 is available in the control unit 44, the control unit 44 applies the first key information S1 to the first key input 30 of the key stage 22. When the first key information S1 appears in the key stage 22, the key stage 22 is enabled to overwrite the first key information S1 previously stored in the membership card 29 with the first key information S1 received at the key input 30. The key stage 22 then supplies composite key information S, which is suitable for correctly decrypting the reproduced encrypted paid-service information signal I, to the decryption means 32. As a result, the decryption means decrypts the reproduced encrypted information signal I with the aid of the composite key information S, and the processing means 35 processes the reproduced information signal I into a video information signal available at the video output 39 and an audio information signal available at the audio output 42.

Thus, the arrangement 1, in accordance with the invention, is suitable for independently requesting a playing authorization. When first key information S1, which represents a playing authorization, is received, the arrangement 1 is enabled to decrypt a reproduced information signal I. Manipulation by non-authorized persons is ruled out almost completely because characteristic billing information, which specifies the number of playing events of paid-service information signals, is generated in the first playing authorization allocation device 51 upon reception of playing authorization request information and can therefore not be altered illegally by a user of the arrangement 1. Furthermore, charging of the fees to the user of the arrangement 1 in accordance with the invention can be effected at comparatively short time intervals and with a particularly low expenditure by the first playing authorization allocation device 51, i.e., the playing authorization allocation device. The first playing authorization allocation device 51 can then handle the collection of charges for a multitude of prerecorded DVHS cassettes and other digital recording media. This advantage of the common collection of charges is attainable particularly in that the enable information E contained in each paid-service information signal I identifies a respective playing authorization allocation device which is allowed and authorized to allocate a playing authorization.

Moreover, it is very advantageous that setting-up the data link, supplying the playing authorization request information, and obtaining the playing authorization up to the correct decryption of the reproduced encrypted paid-service information signal I, can be effected within a very short time interval, as a result of which, the user of the arrangement 1 in accordance with the invention has to wait only very briefly for the reproduction of the paid-service information signal.

A further advantage of the charge collection is that a manufacturer of pre-recorded data carriers, such as DVHS cassettes, DVDs or CD-ROMs, can give a pre-recorded data carrier to customers, and can receive earnings through the charge collection each time that the pre-recorded record carrier is played.

In a second example of an application, an encrypted paid-service information signal I can be reproduced from a DVD 16 by the DVD apparatus 3. The enable information E contained in the reproduced encrypted information signal I identifies the first broadcasting station as a second playing authorization allocation device 53 authorized to allocate a playing authorization. In the absence of a playing authorization, which, as already explained hereinbefore, is characterized by the occurrence of control information SI, the communication means sets up a data link, which is formed by the telephone link 52, to the first broadcasting station identified by the enable information E. The communication means 43 further supplies playing authorization request information to the first broadcasting station via the telephone link 52, and receives a playing authorization for the reproduced encrypted information signal I from the first broadcasting station via the telephone link 52. After the first key information S1, which represents the playing authorization, has been received, and after the first key information S1 has been stored in the membership card 29, the encrypted paid-service information signal I is decrypted correctly in the decryption means 32 and is reproduced by the TV set 4.

In a third example of an application, enable information E, which is contained in a reproduced encrypted paid-service information signal I and which is reproduced from a harddisc drive of a computer, not shown in FIG. 1, identifies the second broadcasting station as the third playing authorization allocation device 57 for the reproduced encrypted paid-service information signal I. In the present case, playing authorization request information is transferred from the control unit 44 to the second broadcasting station via the second communication stage 47 and the microwave antenna 58 by the microwave link 56. In the case of a playing authorization allocated by the second broadcasting station, this authorization (first key information S1) is transferred to the control unit via the microwave link 56, the microwave antenna 58 and the second communication stage 47, and is stored in the membership card 29, thus enabling a correct decryption of the reproduced encrypted information signal.

In a further example of an application, enable information E, which is contained in an encrypted paid-service information signal I reproduced from a DVD by a DVD apparatus 3, identifies the cable TV service unit, i.e., the fourth playing authorization allocation device 60. In the present case, playing authorization request information, which identifies the paid-service information signal to be reproduces, is transmitted to the cable TV service via the cable TV system 59 over the reverse channel identified by the channel information. The cable TV service unit then transmits first key information S1 representing a playing authorization to the communication means 43 over the same channel or another channel of the cable TV system 59.

Thus, the communication means 43 of the arrangement 1 in accordance with the invention supplies playing authorization request information which identifies the reproduced encrypted information signal I, and receives first key information S1, which depends on the playing authorization request information, from at least one playing authorization allocation device. This yields the advantage that, on the basis of the playing authorization request information, each playing authorization allocation device detects which paid-service information signal I is to be reproduced by the user of the arrangement 1. Thus, it is possible, for example, to charge a higher fee for a particularly popular movie recorded on a pre-recorded DVHS video cassette than for a less popular movie. Moreover, the amount to be charged can depend on whether a movie to be played has already been played several times by the owner of the membership card and a quantity discount can be granted.

The arrangement 1 further includes control means 62 for receiving the control information SI from the control information output 40 of the first decoder means in the absence of a playing authorization. The control means 62 further receives playing authorization information WB from the control unit 44, this information being supplied by the control unit 44 when first key information S1, supplied by a playing authorization allocation device, is available. In the absence of a playing authorization for a paid-service information signal I reproduced by the DVHS video recorder 2, this absence being characterized by the occurrence of control information SI, the control means 62 supplies pause information to the DVHS video recorder 2 via the second interface means 13, the bus connection 12 and the first interface means 11 in order to interrupt the reproduction of the paid-service information signal. Moreover, if, subsequently, a playing authorization is present for the paid-service information signal I reproduced by the DVHS video recorder 2, this presence being characterized by the occurrence of playing authorization information WB, the control means 62 then supplies end-of-pause information to the DVHS video recorder 2 via the second interface means 13, the bus connection 12 and the first interface means 11, and sets the DVHS video recorder 2 to the play mode. Similar pause information and end-of-pause information are applied to any reproducing device, i.e., also to the DVD apparatus 3, which is connected to the second interface means 13 via the bus connection 12, and which reproduces an encrypted information signal I.

This yields the advantage that the reproduction of a paid-service information signal I is interrupted until a playing authorization from a playing authorization allocation device is available, and the user of the arrangement 1 consequently does not miss any part of the paid-service information signal I when this is reproduced.

The arrangement 1 further includes receiving means 63 for receiving an encrypted or non-encrypted information signal I from a plurality of broadcasting stations. For this purpose, a tuner stage 64 of the receiving means 63 receives information signals I from the cable TV service unit, i.e., the fourth playing authorization allocation device 60, via the cable TV system 59 and from the second broadcasting station, i.e., the third playing authorization allocation device 57, via the microwave link 56 and the microwave antenna 58. Furthermore, the tuner stage 64 receives information signals I from a third broadcasting station 65 via a terrestrial radio link 66 and a terrestrial antenna 68 provided in an antenna stage 67. In addition, the tuner stage 64 receives information signals I from the first broadcasting station 53 via the satellite radio link 54 and a satellite antenna 69 of the antenna stage 67.

Channel control information K, generated by the entry means 26 through actuation of the "up" button 24 or the "down" button 25, is applied to the tuner stage 64 and to the control input 23 of the processing stage 21. Depending on the channel control information K, an information signal I received in the tuner stage 64 is applied to the information signal input 20 of the verification means 19. An information signal I applied to the information signal input 20 is supplied to the processing stage 21. In the processing stage 21, as already explained hereinbefore, the information signal blocks of the video channel and the associated audio channel selected by the "up" button 24 and the "down" button 25, as well as the additional information associated with the information in these two channels, particularly the corresponding enable information E and the second key information S2, are selected on the basis of the channel control information K. The selected information is made available on the information signal output 27. A information signal I, available on the information signal output 27—which signal can be a paid-service information signal I, which is, consequently, encrypted and which then contains enable information E identifying a playing authorization allocation device allowed to allocate a playing authorization for the encrypted information signal I—is supplied to the second interface means 13 of the arrangement 1. It is to be noted that it is also possible to select a plurality of video channels, audio channels as well as additional information associated with the information in these two channels and to record all this information by the DVHS video recorder 2.

First key information S1 contained in the information signal received from a broadcasting station is detected in the processing stage 21 and is applied to the second key input 31 of the key stage 22 in order to store the first key information S1 in the membership card 29.

By actuating the record button 8 of the entry means 6 of the DVHS video recorder 2, which constitutes a recording and reproducing device, the DVHS video recorder 2 is set to a recording mode. When the recording mode is active, the DVHS video recorder 2 records information signals I, which are applied from the second interface means 13 to the first interface means 11 via the bus connection 12, on the magnetic tape 9 of a DVHS cassette via the operating connection 10. An encrypted paid-service information signal I recorded by the DVHS video recorder 2 can be played back in a reproducing mode activated by actuation of the play button 7, as already set forth hereinbefore.

This yields the advantage that also for a movie transmitted by a broadcasting station and recorded on a DVHS cassette by the DVHS video recorder 2, the broadcasting station can still charge a fee for each reproduction of the pay movie.

In this respect, it is to be noted that a playing authorization for a paid-service information signal I supplied by the third broadcasting station 65 can be granted by the charge collection device, i.e., the first playing authorization allocation device 51, which is allowed by the third broadcasting station 65 to allocate playing authorizations.

It is to be noted that all the playing authorization allocation devices include memory means for storing information about all the paid-service information signals I for which the respective playing authorization allocation device is allowed and authorized to allocate a playing authorization. This information includes, in particular, identification information, which is likewise contained in playing authorization request information and which identifies the information signal I to be reproduced. Moreover, for the identification information identifying each paid-service information signal, it is possible to store associated first key information S1 for decrypting the encrypted information signal as well as billing information which indicates the amount to be charged for the relevant paid-service information signal.

It is to be noted that the memory means 45 may already contain connection set-up information when an arrangement 1 in accordance with the invention is purchased. Moreover, connection set-up information for a new playing authorization allocation device can be stored on an associated membership card 29, this information being supplied to the control unit 44 via a connection not shown in FIG. 1 in order store the connection set-up information in the memory means 55 when the membership card 29 is inserted into the key stage 22. Furthermore, a new playing authorization allocation device can supply the corresponding connection set-up information to the arrangement 1 via a data link in order to store the connection set-up information in the memory means 45.

It is to be noted that the communication means can also set up a data link to an internet network server which constitutes a playing authorization allocation device.

Furthermore, it is to be noted that an arrangement in accordance with the invention can also be built directly into a video recorder, or in a DVD apparatus, or in a TV receiver.

In the embodiment described hereinbefore by way of example, the interrogation means, for independently requesting a playing authorization for a reproduced encrypted information signal, basically comprises the communication means 43 and the processing means 35, of which the first decoder means 36, at the same time, serves as detection means for detecting an encrypted and a non-encrypted or decrypted information signal. Such a construction of the interrogation means has proven to be particularly advantageous in practice. However, it is to be noted that, alternatively, an arrangement in accordance with the invention may comprise differently constructed interrogation means. Such interrogation means can be, for example, means in which the first decoder means for decoding encoded video information signal blocks is not used at the same time as detector means for detecting encrypted or non-encrypted information signals, but in which separate detector means are provided by which encrypted or non-encrypted information signals can be detected. It is likewise possible to provide interrogation means with communication means having another circuit design than in the arrangement in accordance with the invention described with reference to FIG. 1.

What is claimed is:

1. An arrangement for verifying a playing authorization for an information signal reproduced by a reproducing device cooperating with the arrangement when the reproduced information signal is encrypted, and for supplying a decrypted information signal corresponding to said reproduced encrypted information signal when a playing authorization is available, said arrangement comprising:

verification means for receiving a reproduced information signal, and, if said reproduced information signal is encrypted, for supplying key information suitable for correctly decrypting the reproduced encrypted information signal when a playing authorization is available;

decryption means for receiving said key information and for decrypting the reproduced encrypted information signal when said suitable key information is available; and interrogation means for independently requesting a playing authorization, wherein the decryption means further serves as detection means for detecting whether said reproduced information signal is encrypted, and upon such detection, the interrogation means automatically and independently requests a playing authorization from playing authorization allocation means identified in the reproduced information signal.

2. The arrangement as claimed in claim 1, wherein the interrogation means comprises communication means for setting up a data link between the communication means and said playing authorization allocation means comprising at least one playing authorization allocation device in the absence of a playing authorization for a reproduced encrypted information signal, said communication means supplying playing authorization request information to the playing authorization allocation device via the data link, and receiving, from the playing authorization allocation device, a playing authorization for the reproduced encrypted information signal.

3. The arrangement as claimed in claim 2, wherein:

the verification means reads out and supplies enable information contained in a reproduced encrypted information signal, said enable information identifying a playing authorization allocation device allowed to allocate a playing authorization for the reproduced encrypted information signal; and the communication means supplies playing authorization request information to the playing authorization allocation device identified by the enable information.

4. The arrangement as claimed in claim 3, wherein the arrangement further comprises:

receiving means for receiving an encrypted information signal supplied by a broadcasting station, the received encrypted information signal containing enable information identifying a playing authorization allocation device allowed to allocate a playing authorization for the received encrypted information signal;

a recording and reproducing device for recording information signals; and interface means for supplying the received encrypted information signal containing the enable information to the recording and reproducing device for recording the received encrypted information signal.

5. The arrangement as claimed in claim 3, wherein:

the communication means comprises memory means for storing connection set-up information for a playing authorization allocation device identified by said enable information; and the communication means, in the absence of a playing authorization for a reproduced encrypted information signal containing enable information, setting up a data link using the connection set-up information stored in the memory means for supplying playing authorization request information to the playing authorization allocation device identified by the enable information, and receiving a playing authorization for the reproduced encrypted information signal from the playing authorization allocation device via the data link.

6. The arrangement as claimed in claim 2, wherein the communication means supplies playing authorization request information identifying the reproduced encrypted information signal to a playing authorization allocation device, and receives playing authorization from the playing authorization allocation device, said playing authorization being dependent on the playing authorization request information.

7. The arrangement as claimed in claim 2, wherein the arrangement further comprises:

processing means for decoding a reproduced non-encrypted information signal and which form part of the interrogation means, the processing means supplying control information to the communication means, said control information being characteristic of an incorrect decryption of a reproduced encrypted information signal due to the absence of a playing authorization.

8. The arrangement as claimed in claim 2, wherein:

the verification means comprises a key stage for receiving first key information contained in the playing authorization received in the communication means from a playing authorization allocation device, and for receiving second key information contained in the reproduced encrypted information signal, the key stage, when a playing authorization is available, jointly processing the first key information and the second key information, and supplying composite key information to the decryption means, said composite key information being suitable for enabling the decryption means to correctly decrypt the reproduced encrypted information signal.

9. The arrangement as claimed in claim 1, wherein the arrangement further comprises:

interface means for coupling the reproducing device to the arrangement; and control means for supplying, in the absence of a playing authorization, pause information to the reproducing device via said interface means in order to interrupt the reproduction of an encrypted information signal, and for supplying, when subsequently a playing authorization for the encrypted information signal is available, end-of-pause information to the reproducing device via the interface means in order to continue reproduction of the encrypted information signal.

* * * * *